T. I. MOEN.
SAW SET.
APPLICATION FILED APR. 16, 1919.
1,317,807.
Patented Oct. 7, 1919.
2 SHEETS—SHEET 1.
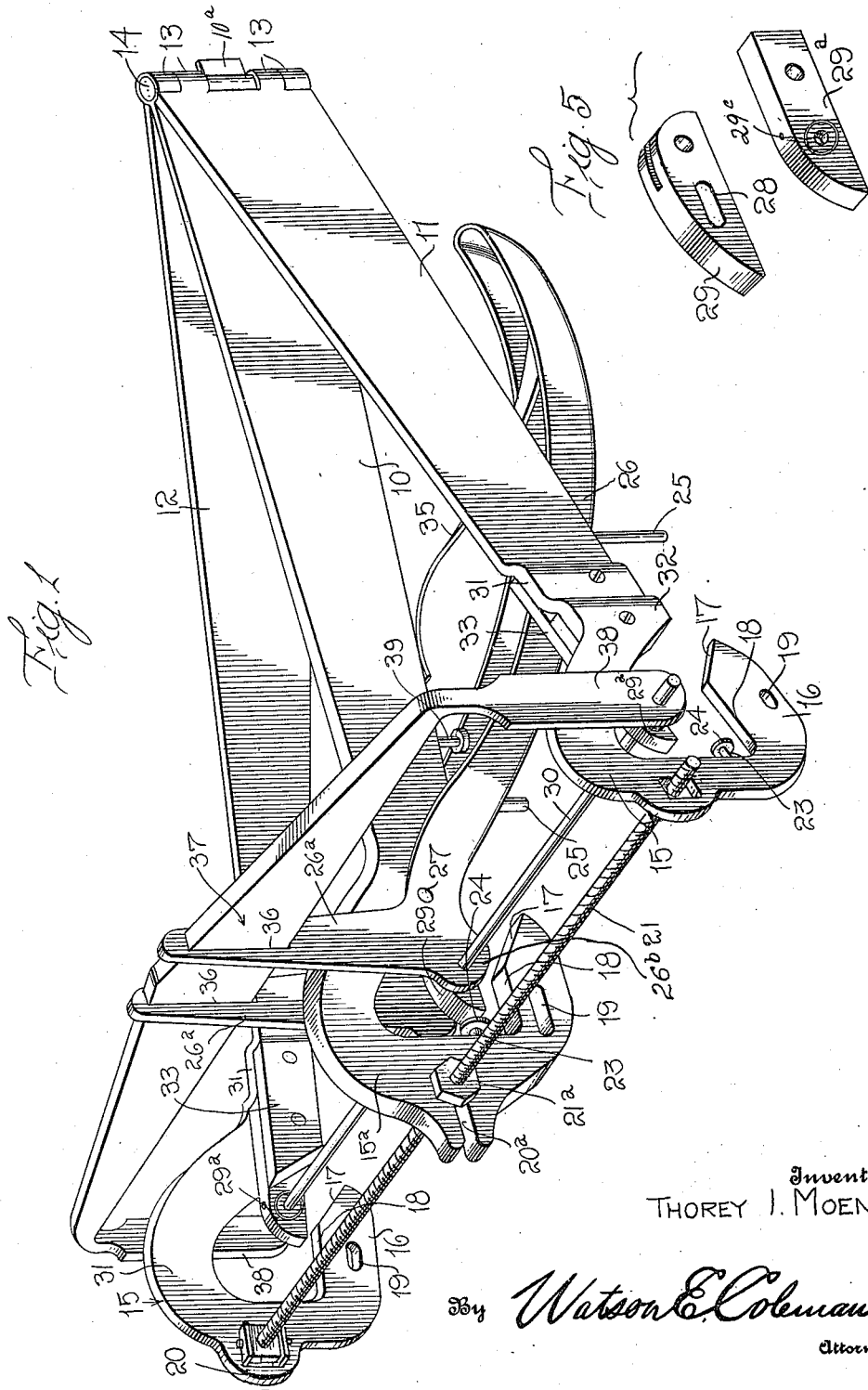
Inventor
THOREY I. MOEN
By Watson E. Coleman
Attorney

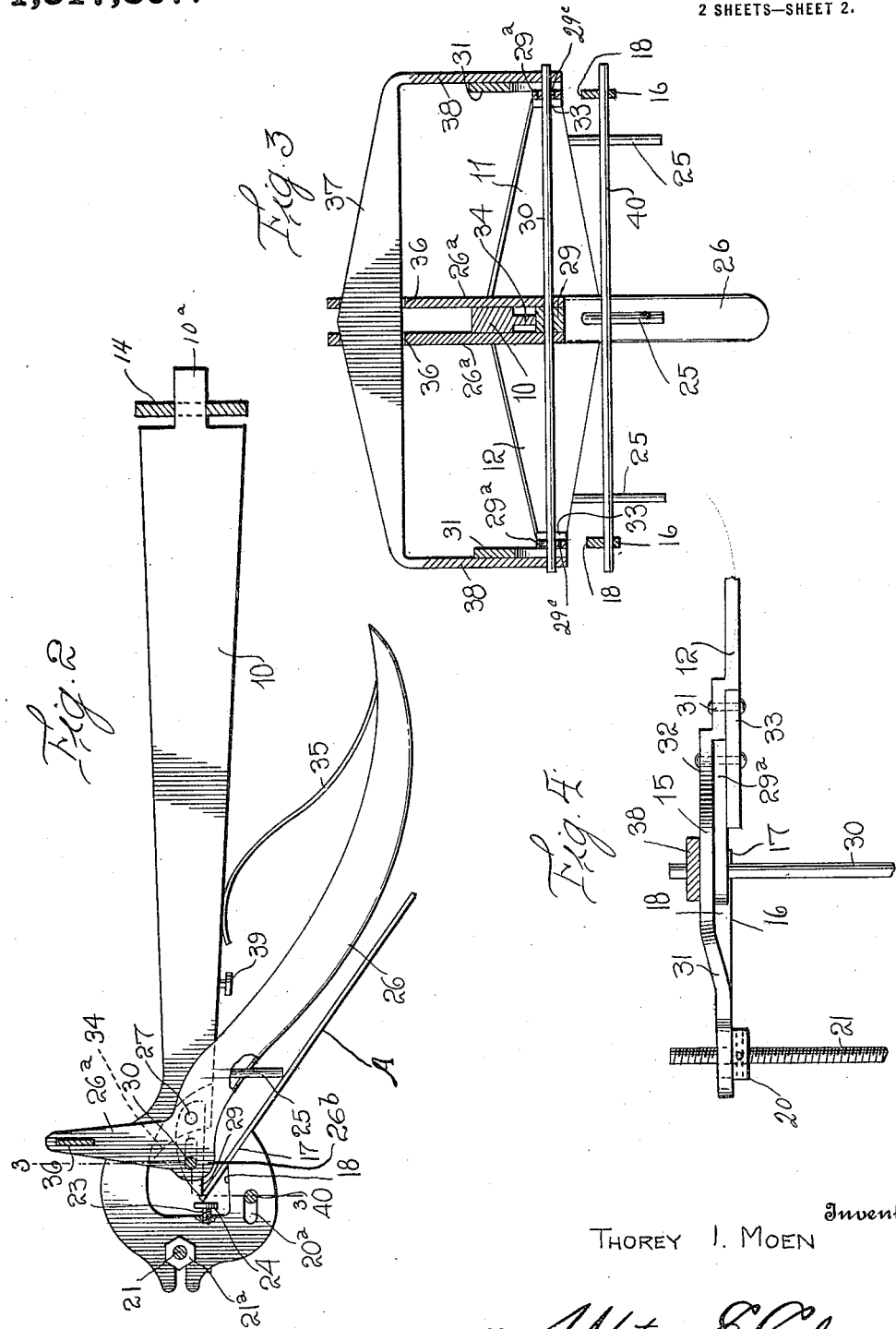

UNITED STATES PATENT OFFICE.

THOREY I. MOEN, OF BELOIT, WISCONSIN.

SAW-SET.

1,317,807.  Specification of Letters Patent.  Patented Oct. 7, 1919.

Application filed April 16, 1919. Serial No. 290,455.

*To all whom it may concern:*

Be it known that I, THOREY I. MOEN, a citizen of the United States, residing at Beloit, in the county of Rock and State of Wisconsin, have invented certain new and useful Improvements in Saw-Sets, of which the following is a specification, reference being had to the accompanying drawings.

This invention relates to saw setting appliances, and particularly to devices which are adjustable for setting differently spaced teeth.

The general object of the invention is to provide a construction of this kind which is adapted to set a plurality of teeth at the same time, and a further object is to provide a plurality of teeth engaging members which are adapted to be set nearer to or farther from each other to correspond with the distance between the teeth.

A further object in this connection is to provide a plurality of teeth engaging members operated by one handle.

Another object is to provide in connection with the mechanism heretofore described, set screws for limiting the movement of the handle and set screws for supporting the saw blade in proper position with relation to the handle to thereby control the angle of the teeth with relation to the saw.

A further object is to provide adjustable stops for the ends of the teeth, these stops being adjustable to correspond to different lengths of teeth.

A further object is to provide a means whereby the saw setting members may be adjusted to any desired width of teeth or space between teeth.

Other objects will appear in the course of the following description.

My invention is illustrated in the accompanying drawings, wherein:—

Figure 1 is a perspective view of my improved saw set;

Fig. 2 is a side elevation of the member 10, the rods 30 and 40 being shown in section;

Fig. 3 is a vertical section on the line 3—3 of Fig. 2;

Fig. 4 is a top plan view of the forward end of the member 12 showing the manner in which the tongue $29^a$ is mounted;

Fig. 5 is a perspective view showing the tongue 29 and one of the tongues $29^a$.

Referring to these figures, 11 and 12 designate two members formed each at one end with hinge heads 13 whereby they may be pivotally connected by a common pintle 14. A middle member 10 has a tongue $10^a$ extending through a slot in the pintle. Thus these three members 10, 11 and 12 may be shifted into or out of a parallel relation. Each of these members, as illustrated in Fig. 1, at its free end is upwardly extended, then outwardly extended, then downwardly extended and then inwardly extended to form a jaw. The jaws on the members 11 and 12 are designated 15 and the jaw on the member 10 is designated $15^a$. All of these jaws have substantially the same form. The inward extension of each jaw is designated 16 and this inward extension is formed with a beveled face 17 and a face 18, which last named face constitutes an anvil. Each inward extension is also provided with an aperture 19, the aperture in the jaw $15^a$ being elongated for the purpose which will be later stated. The jaws 15 of the outer members 10 and 12 are formed with swinging nuts 20, but the jaw $15^a$ at its end is formed with a slotted ear $20^a$. The pivoted or swinging nuts 20 and the slot in the ear $20^a$ are to receive a transversely extending adjusting screw 21 whereby the several members 10, 11 and 12 may be adjusted into or out of a divergent relation. The adjusting screw is held at its middle to the jaw $15^a$ by means of the clamping nuts $21^a$. The jaws 15 and the jaw $15^a$ are each provided with a screw 23 carrying a head 24 on its inner end adapted to be adjusted to fit the depth of the teeth on the saw. In other words, the saw, when disposed upon the faces 17 of the several jaws, is shifted until its teeth abut against the heads 24. Each of the members 10, 11 and 12 is provided inward of the corresponding jaw 15 with an adjustable screw stop 25, which extends downward from the corresponding member and against which the blade of the saw is adapted to rest, so as to hold the saw in proper adjusted relation against the faces 17, or in other words, against the anvil constituted by said faces prior to the bending or setting of the teeth.

For the purpose of bending the teeth, I pivotally mount upon the member 10, the handle 26, this handle being pivoted at 27. The handle is formed at its forward end with upward extensions $26^a$ which are vertically slotted at their upper ends and at the extreme inner end of the handle, there is provided an aperture for the passage of a transverse rod 30. It will be obvious that as the rear end of the handle is moved upward toward the member 10, the rod 30 will be depressed. The handle 26 is transversely U-shaped so as to embrace the member 10, the upward extensions 26$^a$ extending up on each side of the rear end of the jaw 15$^a$ and the shank portion 10. Mounted upon the pin 27 and between the forward end of the handle 26 is a bending tongue 29, which is longitudinally slotted as at 28. Through this slot the transverse rod 30 passes. This tongue 29 has a flat under face and projects out beyond the extension 26$^a$ of the handle and coacts with the face 18 of the jaw 15$^a$.

The shanks of the members 11 and 12 at their forward or free ends are laterally deflected as at 31, then extended forward as at 32 and upwardly arched and laterally deflected and then extended downward to form the jaw. Attached to the inner face of each of the members 11 and 12, forward of the deflection 31, is a strip of metal 33, which lies flush with the inner face of the body of the corresponding member 10 or 12 and between this strip 33 and the deflected portion 32, the tongues 29$^a$ are pivoted, which tongues correspond in action and in form with the tongue 29 on the member 10 but has swinging blocks 29$^c$ through which the rod 30 passes. The reason for deflecting the free ends of the members 10 and 12 to accommodate the tongues 29$^a$ is to permit these members to be moved inward flat against the member 10, which would be impossible did the tongues project out laterally from these members 10 and 12 and in order to prevent the handle 26 or the tongue 29 from projecting laterally and thus preventing the members 11 and 12 from being brought into close contiguity with the member 10, I reduce the thickness of the member 10 at 34 and the tongue 29 is bifurcated to fit over this reduced portion, as illustrated clearly in Fig. 3. A spring 35 acts to throw the rear end of the handle downward and throw the tongues 29 and 29$^a$ upward. Passing through the slots 36 in the upper end of the upward extension 26$^a$ of the handle is a cross bar 37, which has downward extensions 38, through which the bar 30 passes. These legs 38 are disposed just inward of the tongues 29$^a$ and prevent any deflection of the bar under pressure.

It will be obvious now that when the handle 26 is drawn up toward the shank 10, that the forward end 26$^b$ of the handle will be depressed carrying with it the bar 30 and the tongues 29 and 29$^a$ and that these tongues will be brought into operative position with relation to a saw A disposed upon the faces 17 of the jaws, so as to bend the teeth of the saw. For the purpose of limiting this bending movement so as to bend the teeth at different angles, I provide an adjustable stop screw 39, which is disposed in the member 10 and extends down below this member and against which the handle engages.

The members 11 and 12 are shiftable inward or outward toward or from the member 10 and this is accomplished by rotating the screw 21, which is screw-threaded in opposite directions and has screw-threaded engagement with the nuts 20. The slot in the ear 20$^a$ permits the screw-threaded rod 31 to move inward and outward relative to the ear 20$^a$, without becoming disengaged from the ear, the nuts 21$^a$ engaging on each side of the ear 20$^a$. The slot 28 in the tongue 29 also provides for a like movement of the cross bar 30, and it will, of course, be seen that this cross bar 30 can shift through the blocks 29$^c$ in the tongues 29$^a$. The members 10, 11 and 12 may thus be adjusted at different distances from each other and the tongues will be likewise adjusted so that while the tongues will engage three teeth at a time, the tongues will engage teeth which are differently spaced from each other. Now when the handle 26 is moved inward toward the member 10, the handle, through the action of the cross bar 30 and of the yoke composed of the members 32 and 38, will force all of the tongues 29 and 29$^a$ coincidently against their respective anvils, thus bending the saw teeth to a degree depending upon the setting of the stop screws 23.

As before remarked, each of the jaws 15 and 15$^a$ is provided with a transverse aperture 19 in the portion 16. The aperture in the jaw 15$^a$ is in the form of a slot, while that in the jaws 15 is oblong. These apertures act to receive a guide bar 40 (see Fig. 2), by which a file may be guided in evening up the saw teeth. This guide rod is disposed in a vertical plane immediately beneath the outer end of the face 18 with its outer edge even with the outer end of the face 18 and the points of the saw teeth, when these points are disposed against the stops 24, and thus when the points of the saw teeth are filed off, the operator files down to this guide bar and thus all of the saw teeth are made of even length.

The operation of this device will be obvious from what has gone before. The three members 10, 11 and 12 are set to such a position that the three jaws carried thereby are properly spaced from each other according to the spacing of the saw teeth, this angular adjustment of the three members being accomplished by means of the screw 21. The screws 23 are adjusted according to the depth of the teeth on the saw, the limiting stop screw 39 is also adjusted according to the angle to be given to the teeth, and then the saw is disposed against the set screws 25 with its teeth engaged against the heads 24 on the adjusting screws 23. The handle 26 is then operated to cause the bending tongues 29 and 29ª to move downward toward the anvils and bend the saw teeth over to the proper angle in the usual manner. With this construction it is possible to set three teeth at a time and thus greatly expedite the work of setting the saw teeth. Furthermore, the construction provides means for evening up the teeth of the saw, so that they shall be of uniform length. The device may be used to set saw teeth having various distances between the teeth and will also set these teeth at any desired angle.

Having described my invention, what I claim is:—

1. A saw set comprising a plurality of anvils adjustable toward or from each other, a plurality of binding tongues one for each anvil and adjustable therewith, and a single means for shifting all of said tongues coincidently toward the anvils.

2. A saw set comprising a plurality of anvils carried by a plurality of members hinged to each other at their ends remote from the anvils and adjustable into angular relation to thereby variably space the anvils with relation to each other, a tongue carried by each of said members and coacting with the corresponding anvil and shiftable therewith, and means mounted upon one of said members for shifting all of said tongues toward or from their anvils.

3. A saw set comprising a plurality of members hinged to each other at one end, the opposite end of each of said members being formed with a curved jaw, the extremity of the jaw extending toward the hinged end of the member and being formed with a beveled face constituting an anvil, a tongue hinged to each of said members within the jaw thereof and having its free end extending toward the anvil and above it, and a handle mounted upon one of said members operatively connected to all of said tongues and movable to shift the tongues toward the corresponding anvil.

4. A saw set comprising a plurality of members hinged to each other at one end, the opposite end of each of said members being formed with a curved jaw, the extremity of the jaw extending toward the hinged end of the member and being formed with a beveled face constituting an anvil, a tongue hinged to each of said members within the jaw thereof and having its free end extending toward the anvil and above it, a handle mounted upon one of said members operatively connected to all of said tongues and movable to shift the tongues toward the corresponding anvil, and means for limiting the movement of said anvils.

5. A saw set comprising a plurality of members hinged to each other at one end, the opposite end of each of said members being formed with a curved jaw, the extremity of the jaw extending toward the hinged end of the member and being formed with a beveled face constituting an anvil, a tongue hinged to each of said members within the jaw thereof and having its free end extending toward the anvil and above it, a handle mounted upon one of said members operatively connected to all of said tongues and movable to shift the tongues toward the corresponding anvil, means for limiting the movement of said anvils, and a set screw on each jaw limiting the movement of a saw into said jaw.

6. A saw set comprising a plurality of members hinged to each other at one end for movement into or out of a divergent relation, each of said members at its end away from the point of pivotal connection being formed to provide a jaw having an inwardly extending portion forming an anvil, a plurality of tongues each mounted on one of said members and disposed within the corresponding jaw and extending toward the anvil, a handle pivotally mounted upon one of said members, a transverse bar carried by said handle and engaging all of said tongues, a spring urging the handle in one direction, and means for limiting the inward movement of the handle.

7. A saw set comprising a plurality of members hinged to each other at one end for movement into or out of a divergent relation, each of said members at its end away from the point of pivotal connection being formed to provide an arm having an inwardly extending portion forming an anvil, a plurality of tongues each mounted on one of said members and disposed within the corresponding jaw and extending toward the anvil, a handle pivotally mounted upon one of said members, a transverse bar carried by said handle and engaging all of said tongues, a spring urging the handle in one direction, means for limiting the inward movement of the handle, and a screw operatively engaging all of said members whereby the members may be adjusted into or out of a divergent relation.

8. A saw set comprising a plurality of members hinged to each other at one end for movement into or out of divergent relation, each of said members away from the point of pivotal connection having a lug, the lug being formed with an aperture, a screw-threaded adjusting rod passing through said apertures and operatively engaged with said members, said rod providing means whereby the members may be shifted into or out of a parallel position, a handle mounted upon one of said members, a plurality of bending tongues mounted upon the jaws of said members and coacting with anvils formed upon said members, and a handle operatively connected to all of said tongues for simultaneously shifting said bending tongues toward the anvils.

9. A saw set comprising a plurality of members hinged to each other at one end for movement into or out of divergent relation, each of said members at its end away from the point of pivotal connection being formed to provide a jaw having an inwardly extending portion forming an anvil, a plurality of tongues each mounted on one of said members and disposed within the corresponding jaw and in operative relation with an anvil, a handle pivotally mounted upon one of said members, a transverse bar carried by said handle and engaging all of said tongues, a spring urging the handle in one direction, and adjustable means for limiting the inward movement of the handle.

10. A saw set comprising a plurality of members hinged to each other at one end for movement into or out of divergent relation, each of said members at its end away from the point of pivotal connection being formed to provide a jaw having an inwardly extending portion forming an anvil, a plurality of tongues each mounted on one of said members and disposed within the corresponding jaw and in operative relation with an anvil, a handle pivotally mounted upon one of said members, a transverse bar carried by said handle and engaging all of said tongues, a spring urging the handle in one direction, adjustable means for limiting the inward movement of the handle, and adjustable stops carried by said jaws and forming means for adjusting the extent to which the saw teeth shall be disposed over the anvil.

11. A saw set comprising a plurality of members hinged to each other at one end for movement into or out of divergent relation, each of said members at its end away from the point of pivotal connection being formed to provide a jaw having an inwardly extending portion forming an anvil, a plurality of tongues each mounted on one of said members and disposed within the corresponding jaw and in operaitve relation with an anvil, a handle pivotally mounted upon one of said members, a transverse bar carried by said handle and engaging all of said tongues, a spring urging the handle in one direction, adjustable means for limiting the inward movement of the handle, each of said jaws being provided immediately beneath the anvil with a transversely extending aperture, and a guide bar removably disposed in said aperture, the guide bar providing means for limiting the inward movement of a file in filing the saw teeth.

In testimony whereof I hereunto affix my signature in the presence of two witnesses.

THOREY I. MOEN.

Witnesses:
JOHN C. NELSON,
HULDA AMSTUTZ.

Copies of this patent may be obtained for five cents each, by addressing the "Commissioner of Patents, Washington, D. C."